United States Patent [19]

Sahara et al.

[11] Patent Number: 4,786,408
[45] Date of Patent: Nov. 22, 1988

[54] FILTRATION APPARATUS WITH MEANS FOR PREVENTING PEELING OFF OF A PRE-COAT LAYER

[75] Inventors: Hirohisa Sahara, Yaizu; Hiroshi Kuroda, Komae; Satoshi Noguchi, Fujieda; Seiichiro Ichikawa, Shizuoka; Toshio Otsuka, Tokyo, all of Japan

[73] Assignee: Sapporo Breweries Limited, Tokyo, Japan

[21] Appl. No.: 13,447

[22] Filed: Feb. 11, 1987

[30] Foreign Application Priority Data

Apr. 16, 1986 [JP] Japan .............................. 61-56026[U]
May 9, 1986 [JP] Japan .............................. 61-68850[U]

[51] Int. Cl.$^4$ .............................................. B01D 37/02
[52] U.S. Cl. .................... 210/193; 210/323.2; 210/436; 210/472
[58] Field of Search ............... 210/193, 323.2, 436, 210/472, 416.1

[56] References Cited

U.S. PATENT DOCUMENTS

| | | | |
|---|---|---|---|
| 3,666,097 | 5/1972 | Ryan | 210/193 |
| 3,997,441 | 12/1976 | Pamplin | 210/193 X |
| 4,267,039 | 5/1981 | Ryan | 210/193 X |
| 4,293,414 | 10/1981 | Giannelli | 210/193 |

Primary Examiner—Richard V. Fisher
Assistant Examiner—Coreen Y. Lee
Attorney, Agent, or Firm—Frishauf, Holtz, Goodman & Woodward

[57] ABSTRACT

A filtration apparatus having one or more upright tubular filter elements having a surface coated with a precoat layer of a filter aid through which a liquid is filtered. Different from conventional apparatuses, the filter element of the present invention is provided with a gas exhaust tube or liquid drain tube connected to the upper or lower part of the filter element, respectively. By virtue of this means, the liquid used for forming the pre-coat layer as the suspension medium can be completely discharged out of the apparatus prior to introduction of the liquid to be filtered so that the liquid in the apparatus can be switched from the pre-coat forming liquid to the filtered liquid without producing a mixture thereof, and without causing defects in the pre-coat layer.

11 Claims, 6 Drawing Sheets

FILTRATION APPARATUS WITH MEANS FOR PREVENTING PEELING OFF OF A PRE-COAT LAYER

BACKGROUND OF THE INVENTION

The present invention relates to a filtration apparatus and, more particularly, to an improvement of a filtration apparatus in which a so-called pre-coat layer of a filter aid is formed on the surface of a filter element or filter medium and the liquid is filtered through the thus formed pre-coat layer. Filtration apparatuses of this type are widely used in the manufacturing process of alcoholic drinks such as beer, wine, Japanese sake and the like, seasonings such as soy sauce, vinegar, sugar, cooking oil and the like, other beverages such as fruit-based drinks, carbonated drinks, mineral water, Oolong tea and the like, pharmaceuticals and so on.

As is known, a type of filtration procedure utilizes a pre-coat layer which is formed of a filter aid such as diatomaceous earth, perlite, cellulosic powder, active carbon and the like on the surface of filter elements in a substantial thickness and through which the liquid is filtered.

The most conventional material as the filter element, on which the pre-coat layer is formed, includes filter cloth, filter net, filter paper and the like although several more rigid materials are sometimes used including punched metal tubes spirally wound with a wire, corrugated rectangular tubes (or tubes having an undulate polygonal cross section) spirally wound with a wire, ceramic-made cylindrical elements and so on. Different types of the filter elements may be used either alone or as a combination of two types or more.

Various types of filtration apparatuses utilize one or more cylindrical or polygonally tubular filter elements provided with a pre-coat layer in an upright disposition. These filtration apparatuses are classified into two classes depending on the position at which the filtrate is taken out of the filter element. Namely, the filtrate may be discharged at an upper part or at a lower part of the filter element. A problem in each of these filtration apparatuses is that, since the pre-coat layer is formed on a vertical surface, the pre-coat layer sometimes falls off the surface of the filter element not only in the course of forming of the pre-coat layer of a filter aid but also during the filtering operation through the thus formed pre-coat layer, especially, when the liquid flow through the pre-coat layer is interrupted.

In connection with forming the pre-coat layer of a filter aid on the surface of a filter element, it is a possible way that a dispersion of the filter aid, from which the filter aid should be deposited to form the pre-coat layer on the surface of the filter element, is prepared by use of a liquid which is the liquid to be filtered therethrough. This method, in which the filter element and the filter aid are contacted from the very beginning by the liquid to be filtered, sometimes causes problems when the amount of certain soluble materials dissolved out from the filter aid and entering the filtrate must be limited or when microbiological contamination of the filtration system must be avoided. It is a usual practice in such cases that the pre-coat layer is formed using a dispersion of the filter aid in a liquid which is not the same one as the liquid to be filtered, such as cold or hot water, and thereafter the liquid passing through the precoat layer is gradually switched to the liquid to be filtered without interrupting the liquid flow therethrough.

When a process of filtration is started with formation of a pre-coat layer in the above described manner, it is an unavoidable consequence that a considerably large portion of the liquid coming out of the filter element in the course of the above mentioned liquid switching is a mixture of the first liquid used as the dispersing medium of the filter aid to form the pre-coat layer and the second liquid which is the liquid to be subjected to the filtration treatment. Such a fraction of liquid mixture naturally contains the desired filtrate constituent only in a low concentration so that it is discarded as a waste or stored in a separate reservoir from which it is returned bit by bit to the preceding step of the process.

The above mentioned way of discarding the transitive filtrate is undesirable when the filtered liquid is very expensive or when certain detriment is anticipated by discarding the liquid while the alternative way of collecting the transitive filtrate in a separate reservoir before disposal or recycling is economically disadvantageous in respect of the investment for the facilities and consumption of large manpower and time.

In order to solve the above mentioned problem concerning the transitive filtrate which is a mixture of the liquid used for pre-coat forming and the liquid to be filtered, a method has been proposed in which the space inside the filter apparatus is pressurized with a gas such as air, carbon dioxide and the like after completion of formation of the pre-coat layer on the surface of the filter element so as to discharge the liquid used for pre-coat forming. This method also cannot provide a complete solution of the problem. For example, the pre-coat layer may fall off the surface of the filter element partly or wholly during the discharge of the liquid under pressurization or in the course of filling the filter element with the liquid to be filtered therethrough and tiny holes are sometimes formed in the pre-coat layer so that it is a difficult matter to keep the pre-coat layer in a complete defect-free condition. This problem is particularly serious in a filtration apparatus of the type in which the filtrate is taken out of the apparatus at an upper part thereof.

SUMMARY OF THE INVENTION

Accordingly, the present invention has as an object to provide a filtration apparatus in which the liquid is filtered through a pre-coat layer formed on the surface of a filter element without the problem caused by the transitive filtrate which is a mixture of the liquid used in the formation of the pre-coat layer and the liquid to be filtered.

A filtration apparatus according to the first embodiment of the present invention comprises a tubular filter element installed in an upright disposition having a surface on which a pre-coat layer of a filter aid is formed to filter a liquid therethrough, and a gas exhaust tube connected to the upright tubular filter element at a upper part thereof.

A filtration apparatus according to the second embodiment of the present invention comprises a tubular filter element installed in an upright disposition having a surface on which a pre-coat layer of a filter aid is formed to filter a liquid therethrough, and a liquid drain tube connected to the upright tubular filter element at a lower part thereof.

DETAILED DESCRIPTION OF THE PREFERRED EMBODIMENTS

In the following, the filtration apparatus of the present invention is described in more detail with reference to the accompanying drawing.

Figure 1:
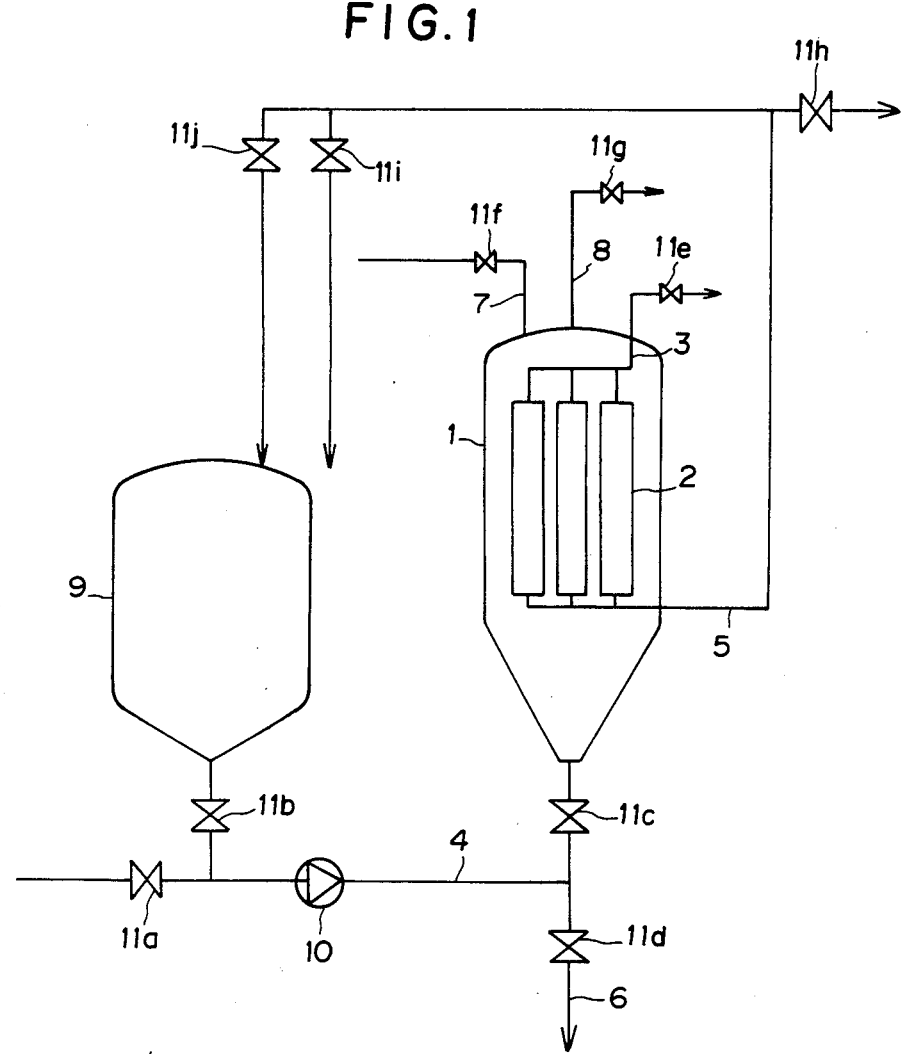
FIG. 1 is an illustration of a flow sheet of a filtration system having a filtration apparatus according to the first embodiment of the invention built therein.

In FIG. 1 which is an illustration of a flow sheet of a filtration system having a filtration apparatus according to the first embodiment of the invention, the filtration apparatus 1 has a plural number of tubular filter elements 2 each having a circular or polygonal cross section in an upright disposition inside thereof. The upper ends of these filter elements 2 are connected to a gas exhaust tube 3 opening to the atmospheric air through a valve 11e. The liquid to be filtered is introduced into the filtration apparatus 1 from the liquid feed line 4 through the valve 11c by means of a pump 10. The pre-coat slurry contained in the pre-coat tank 9 is introduced into the filtration apparatus 1 through the valves 11b and 11c also by means of the pump 10. The filtrate coming out of the filter elements 2 is discharged through the filtrate discharge tube 5 while the liquid drain line 6 with a valve 11d serves to empty the filtration apparatus 1. The filtration apparatus 1 can be pressurized with a gas through the gas feed line 7 by opening the valve 11f and the pressurizing gas can be released to the ambient atmosphere through the primary gas vent tube 8 by opening the valve 11g. The system has several more valves 11a, 11h, 11i and 11j.

Figure 2:
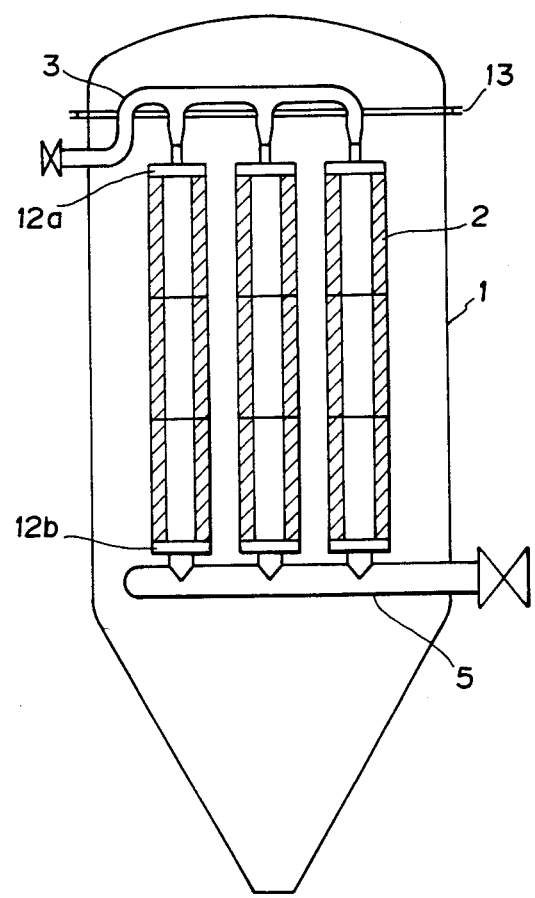
FIG. 2 schematically illustrates an axial cross sectional view of a filtration apparatus according to the first embodiment of the invention.
Figure 3:
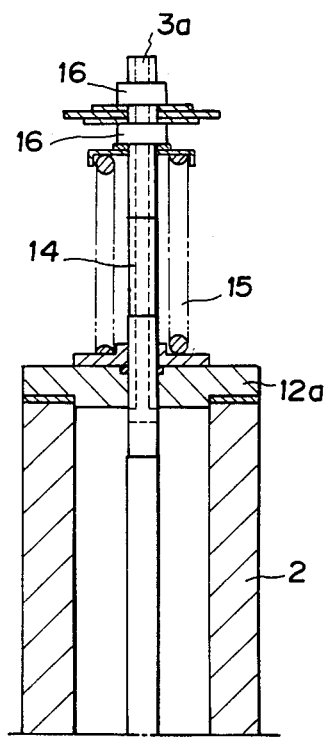
FIGS. 3a and 3b are each a detailed illustration of a part of the filtration apparatus illustrated in FIG. 2 showing the conjunction of the gas exhaust tube and the filter element.
Figure 3:
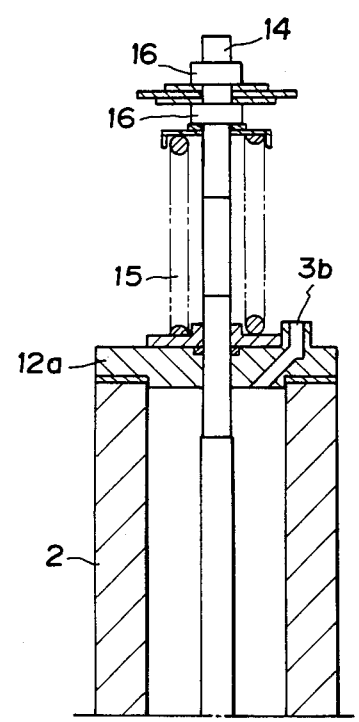

FIG. 2 schematically illustrates an axial cross sectional view of another model of the filtration apparatus 1 and the reference numerals 2, 3 and 5 each correspond to the respective part 2, 3 or 5 in FIG. 1. Each of the filter elements 2 has an upper and a lower end member 12a and 12b by which it is held inside the housing of the filtration apparatus 1 provided with a pair of flanges 13 at which the covering can be disassembled from the body of the apparatus 1. In the apparatus illustrated in FIG. 2, each of the filter elements 2 is comprised of three unit members made of a ceramic material in a tandem arrangement by fastening with the upper and lower end members 12a and 12b. FIGS. 3a and 3b are each a detailed illustration of a part of the apparatus shown in FIG. 2 to demonstrate the conjunction of the gas exhaust tube 3 having a gas outlet opening 3a or 3b, respectively, to the filter element 2 by means of a spindle 14 for positioning of the filter element 2, a spring 15 and a nut 16.

Figure 4:
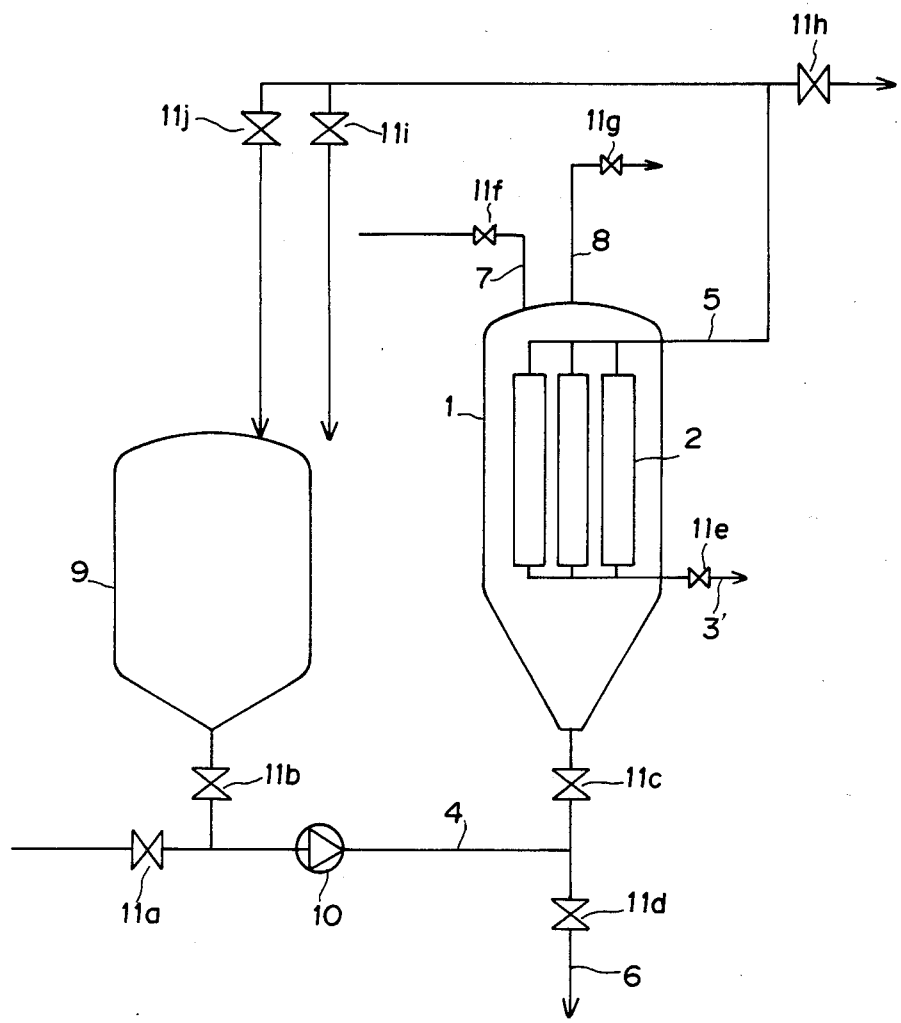
FIG. 4 is an illustration of a flow sheet of a filtration system having a filtration apparatus according to the second embodiment of the invention built therein.

In FIG. 4 which is an illustration of a flow sheet of a filtration system having a filtration apparatus according to the second embodiment of the invention, the filtration apparatus 1 has a plural number of tubular filter elements each having a circular or polygonal cross section in an upright disposition inside thereof. The lower ends of these filter elements 2 are connected to a liquid drain tube 3' opening to the atmospheric air through a valve 11e. The liquid to be filtered is introduced into the filtration apparatus 1 from the liquid feed line 4 through the valve 11c by means of a pump 10. The pre-coat slurry contained in the pre-coat tank 9 is introduced into the filtration apparatus 1 through the valves 11b and 11c also by means of the pump 10. The filtrate coming out of the filter elements 2 is discharged through the filtrate discharge tube 5 while the liquid drain line 6 with a valve 11d serves to empty the filtration apparatus 1. The filtration apparatus 1 can be pressurized with a gas through the gas feed line 7 by opening the valve 11f and the pressurizing gas can be released to the ambient atmosphere through the gas vent tube 8' by opening the valve 11g. The system has several more valves 11a, 11h, 11i and 11j.

Figure 5:
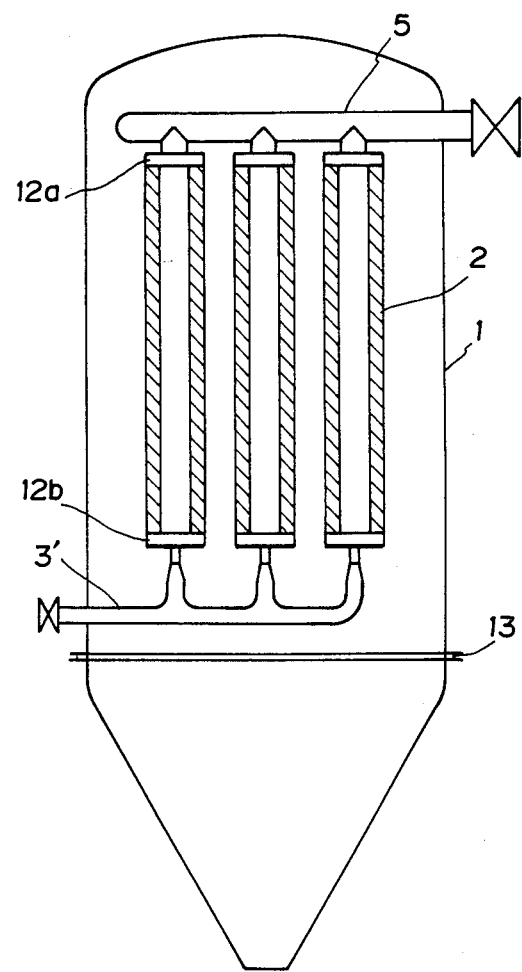
FIG. 5 schematically illustrates an axial cross sectional view of a filtration apparatus according to the second embodiment of the invention.
Figure 6:
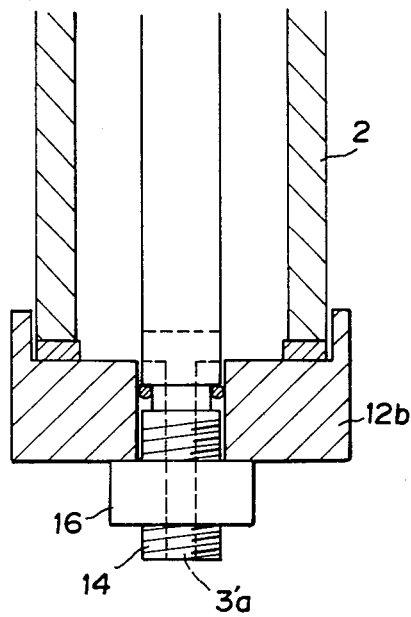
FIG. 6 is a detailed illustration of a part of the filtration apparatus illustrated in FIG. 5 showing the conjunction of the liquid drain tube and the filter element.
Figure 7:
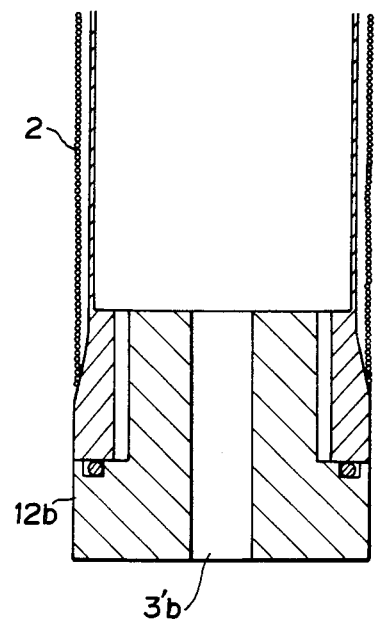
FIG. 7 is a detailed illustration of a part corresponding to FIG. 6 of a filter element formed by spirally winding a wire around a tube of a punched metal or a corrugated rectangular tube showing the conjunction of the liquid drain tube and the filter element.

FIG. 5 schematically illustrates an axial cross sectional view of another model of the filtration apparatus 1 according to the second embodiment of the invention. The reference numerals 2, 3' and 5 each correspond to the respective part 2, 3' or 5 in FIG. 4. Each of the filter elements 2 has an upper and a lower end member 12a and 12b by which it is held inside the housing of the filtration apparatus 1 provided with a pair of flanges 13 at which the conical bottom member of the housing can be disassembled from the body of the apparatus 1. Each of the filter elements 2 is a cylinder made of a ceramic material and held inside the housing of the apparatus 1 by means of the upper and lower end members 12a and 12b. FIG. 6 is a detailed illustration of a part of the apparatus shown in FIG. 5 to demonstrate the conjunction of the liquid drain tube 3' having an opening 3'a by means of a spindle 14 for positioning of the filter element 2 and a nut 16. FIG. 7 is a detailed illustration of a part corresponding to FIG. 6 of a filter element formed by spirally winding a wire around a tube of a punched metal tube or a corrugated rectangular tube showing the conjunction of the liquid drain tube 3' with a liquid drain opening 3'b and the filter element 2.

Usable filter elements in the inventive filtration apparatus includes a variety of known tubular ones having a circular or polygonal cross section without particular limitations. Particularly preferable filter elements are ceramic-made cylindrical elements, those formed by spirally winding a wire around a punched metal tube or a corrugated rectangular tube. Dimensions of the filter elements such as height, wall thickness, inner diameter and the like as well as the number of the filter elements uprightly installed in the filtration apparatus of the invention are not limitative and can be suitably selected to comply with the intended filtration process. When the filtration apparatus has a plurality of the filter elements, each of the filter elements may be connected to a gas exhaust tube or liquid drain tube through a gas exhaust opening or liquid drain opening independently of the other filter elements. Alternatively, it is preferable that each of the filter elements is connected at the gas exhaust or liquid drain opening to one end of a separate gas exhaust tube or liquid drain tube while the other ends of the gas exhaust tubes or liquid drain tubes are combined in a single collecting pipe through which the gas or liquid is discharged.

The inner diameter of the gas exhaust opening or liquid drain opening may be sufficient when an appropriate volume of the gas or liquid can be taken out of the filter element by pressurizing or filling the filtration apparatus with the gas or liquid. According to the results of the experiments undertaken by the inventors, the gas exhaust opening should preferably have an inner diameter in the range from one fifteenth to one third of the inner diameter of the filter element while the liquid drain opening should preferably have an inner diameter which is not larger than the inner diameter of the filter element but not smaller than one twentieth of the inner diameter of the filter element. When the inner diameter of the gas exhaust opening or the liquid drain opening is outside the above mentioned respective range, the gas exhaustion or liquid drain cannot be achieved with an efficiency as high as desired. The inner diameter of the gas exhaust tube or liquid drain tube adequately selected in consideration of the cross sectional area of the gas exhaust opening or the liquid drain opening, the number of the filter elements in the filtration apparatus and other parameters. The gas exhaust tube or liquid drain tube should be made preferably of a stainless steel in most cases although the material may be selected depending on the particularly intended filtration process in which the inventive filtration apparatus is used.

As is described above in detail, the most characteristic feature of the invention is that the gas exhaust tube or liquid drain tube is connected to the filter element at the upper part or lower part, respectively, thereof to give a possibility of filling the filtration apparatus with the liquid to be filtered or discharging the liquid for pre-coat forming keeping the once formed pre-coat layer in a defect-free condition. Namely, the procedures of forming of the pre-coat layer, discharging of the liquid for pre-coat forming, interruption of the liquid flow and filling of the filtration apparatus with the liquid to be filtered can be performed without the problem of falling off of the pre-coat layer. Thus, the filtration process using the inventive filtration apparatus can be performed without the disadvantage of the mixture of the liquid for pre-coat forming and the liquid to be filtered otherwise unavoidable in the transitive stage. This is because, in the inventive filtration apparatus, different from conventional filtration apparatuses utilizing a pre-coat layer, formation of the pre-coat layer can be directly followed by complete discharge of the liquid used for the formation of the pre-coat layer out of the filtration apparatus prior to introduction of the liquid to be filtered into the apparatus without falling of the once formed pre-coat layer or formation of tiny holes therein. Absence of the liquid mixture otherwise produced in the transitive stage of switching from the liquid for pre-coat forming to the liquid to be filtered provides great advantages not only relative to the costs for the disposal or recycling treatment of such a liquid mixture but also in respect of improvements in the quality of the product produced in the process involving filtration.

In the following, the filtration apparatus of the invention is described in more detail by way of examples.

EXAMPLE 1

The filtration apparatus used in this test had 19 ceramic-made cylindrical filter elements uprightly installed in the housing. Each of the filter elements was constructed of three unit elements each having a height of 500 mm, inner diameter of 70 mm and wall thickness of 25 mm in a tandem arrangement. The spindle for positioning of the filter element was provided with a gas exhaust opening of 7 mm diameter at the upper end thereof so that the gas inside the apparatus could be discharged to the outer atmosphere through a gas exhaust tube connected to the opening. A filtration system was constructed using this filtration apparatus according to the flow sheet illustrated in FIG. 1.

The pre-coat tank 9 was filled with an aqueous suspension of diatomaceous earth which was circulated along a path of valve 11b, pump 10, valve 11c, filtration apparatus 1, filtrate discharge tube 5, valve 11j and pre-coat tank 9 so as to form a pre-coat layer of diatomaceous earth on the outer surface of the filter elements 2.

When the pre-coat layer had been completed, the valves 11b and 11j were closed with the pump 10 turned off and, simultaneously, carbon dioxide gas was introduced into the filtration apparatus by opening the valve 11f so as to discharge the water for pre-coat forming by opening the valve 11i. When the liquid surface in the filtration apparatus 1 had reached the level of the filtrate discharge tube 5, the valve 11d was opened to completely discharge the remaining water. Further, the water for pre-coat forming remaining in the piping between the valves 11a and 11d was discharged by opening the valves 11a and 11d for a short while followed by closing.

Thereafter, the filtration apparatus 1 was filled with beer introduced thereinto through the valve 11a, pump 10 and valve 11c. The air inside was discharged during this procedure through the secondary gas exhaust tube 3 by opening the valve 11e. After completion of filling of the apparatus with the beer, the beer was filtered through a path of the valve 11a, pump 10, valve 11c, filtration apparatus 1 and valve 11h by simultaneously closing the valve 11e and opening the valve 11h.

The above described filtration of beer could be performed absolutely without producing a mixture of the water for pre-coat forming and the beer and removal of the yeast contained in the beer was complete. No defects were found at all in the pre-coat layer during the filtration procedure such as falling off of the pre-coat layer and formation of tiny holes therein.

COMPARATIVE EXAMPLE 1

The filtration system and filtration apparatus were substantially the same as in Example 1 except that the apparatus had no secondary gas exhaust tube 3. The filtration apparatus was filled with beer under gas discharge by opening the valve 11g or the valve 11i. The results of filtration were not satisfactory due to partial falling of the pre-coat layer and formation of tiny holes in the upper part of the pre-coat layer.

EXAMPLE 2

The filtration system was constructed according to the flow sheet illustrated in FIG. 1 using a filtration apparatus in which a single ceramic-made cylindrical filter element was installed in an upright disposition. The filter element was constructed of three unit elements each having a height of 500 mm, inner diameter of 70 mm and wall thickness of 25 mm in a tandem arrangement and the upper end member 12a of the element was provided with a gas exhaust opening of 7 mm diameter to which a gas exhaust tube was connected.

The procedure of filtration using the above described filtration system was substantially the same as in Example 1 excepting replacement of the beer with a sugar syrup and carbon dioxide gas with air. The results were that the sugar syrup could be filtered without dilution by intermixing of water and removal of the yeast contained in the sugar syrup was complete.

EXAMPLE 3

The filtration system and filtration apparatus were substantially the same as in Example 1 except that the filtration apparatus had seven filter elements each formed of a corrugated rectangular tube having a height of 700 mm, inner diameter of 26 mm and wall thickness of 2 mm spirally wound with a wire. Oolong tea was filtered using this filtration apparatus in substantially the same manner as in Example 1 excepting replacement of the carbon dioxide gas with nitrogen. The results were that the Oolong tea could be filtered without dilution by intermixing of water and removal of the bacteria contained in the Oolong tea was complete.

EXAMPLE 4

The filtration apparatus had seven ceramic-made cylindrical filter elements uprightly installed in the housing. Each of the filter elements had a height of 700 mm, inner diameter of 20 mm and wall thickness of 5 mm and the spindle for positioning of the filter element was provided with a liquid drain opening of 7 mm diameter at the lower end of the element so that the liquid inside the apparatus could be discharged to the outside of the apparatus through a liquid drain tube connected to the opening. A filtration system as constructed using this filtration apparatus according to the flow sheet illustrated in FIG. 4.

The pre-coat tank 9 filled with an aqueous suspension of diatomaceous earth which was circulated along a path of valve 11b, pump 10, valve 11c, filtration apparatus 1, filtrate discharge tube 5, valve 11j and pre-coat tank 9 so as to form a pre-coat layer of diatomaceous earth on the outer surface of the filter elements 2.

When forming of the pre-coat layer had been completed, the valves 11b and 11j were closed with the pump 10 turned off and, simultaneously, carbon dioxide gas was introduced into the filtration apparatus 1 by opening the valve 11f so as to discharge the water for pre-coat forming by opening the valve 11e. When the liquid surface in the filtration apparatus 1 had reached the level of the liquid drain tube 3', the valve 11d was opened to completely discharge the remaining water. Further, the water for pre-coat forming remaining in the piping between the valves 11a and 11d was discharged by opening the valves 11a and 11d for a short while followed by closing.

Thereafter, the filtration apparatus 1 was filled with beer introduced thereinto through the valve 11a, pump 10 and valve 11c. The air inside was discharged during this procedure by opening the valve 11i. After completion of filling of the apparatus with the beer, the beer was filtered through a path of the valve 11a, pump 10, valve 11c, filtration apparatus 1 and valve 11h by simultaneously closing the valve 11i and opening the valve 11h.

The above described filtration of beer could be performed absolutely without producing a mixture of the water for pre-coat forming and the beer and removal of the yeast contained in the beer was complete. No defects were found at all in the pre-coat layer during the filtration procedure such as falling of the layer and formation of tiny holes therein.

COMPARATIVE EXAMPLE 2

The system and apparatus for the filtration of beer were substantially the same as in Example 4 except that the filtration apparatus had no liquid drain tube 3' and the water for pre-coat forming was discharged by opening the vavles 11c and 11d and/or the valve 11i. The results of filtration were not satisfactory due to partial falling of the pre-coat layer and formation of tiny holes in the pre-coat layer.

EXAMPLE 5

The filtration system and filtration apparatus were substantially the same as in Example 4 except that the filtration apparatus had seven filter elements each formed of a corrugated rectangular tube having a height of 700 mm, inner diameter of 26 mm and wall thickness of 2 mm spirally wound with a wire. Oolong tea was filtered using this filtration apparatus in substantially the same manner as in Example 4 excepting replacement of the carbon dioxide gas with nitrogen. The results were that the Oolong tea could be filtered without dilution by intermixing of water and removal of the bacteria contained in the Oolong tea was complete.

What is claimed is:

1. A filtration apparatus comprising:
   at least one upright tubular filter element mounted in a housing, and having an outer surface on which a pre-coat layer of a filter aid is to be formed such that a liquid to be filtered is passed through said pre-coat layer and through said filter element from said outer surface toward an inner surface thereof;
   means for feeding a liquid suspension including a liquid carrying a pre-coat material into said housing and to said at least one tubular filter element for forming said pre-coat layer on said surface of said at least tubular filter element;
   means for feeding a liquid to be filtered into said housing such that said liquid to be filtered passes through said at least one precoated filter element;
   means for discharging filtrate from said at least one filter element and from said housing;
   means for feeding a purging gas into said tubular housing for pressurizing the interior of said housing for removing said liquid carrying said pre-coat material from said tubular filter element;
   means for discharging said liquid suspension from said housing; and
   purging gas exhaust means including a purging gas exhaust tube coupled to an opening on an upper part of said at least one tubular filter element for removing said purging gas from the inner part of said at least one tubular filter element and from the filter apparatus prior to input of the liquid to be filtered.

2. The filtration apparatus of claim 1, wherein:
   said pre-coat is applied to an outer surface of said at least one tubular filter element; and said filtrate discharging means and said purging gas exhaust means are coupled to remove said filtrate and said purging gas, respectively, from the interior of said at least one tubular filter element.

3. The filtration apparatus of claim 2, wherein said filtrate discharging means is coupled to a lower part of said at least one tubular filter element.

4. The filtration apparatus of claim 2, further comprising a further gas exhaust means coupled to said housing for exhausting gas from said housing exterior of said at least one filter element.

5. The filtration apparatus of claim 1, further comprising a further gas exhaust means coupled to said housing for exhausting gas from said housing exterior of said at least one filter element.

6. A filtration apparatus comprising:
at least one upright tubular filter element mounted in a housing, and having an outer surface on which a pre-coat layer of a filter aid is to be formed such that a liquid to be filtered is passed through said pre-coat layer and through said filter element from said outer surface toward an inner surface thereof;
means for feeding a liquid suspension including a liquid carrying a pre-coat material into said housing and to said at least one tubular filter element for forming said pre-coat layer on said surface of said at least tubular filter element;
means for feeding a liquid to be filtered into said housing such that said liquid to be filtered passes through said at least one precoated filter element;
means for discharging filtrate from said at least one filter element and from said housing;
means for feeding a purging gas into said tubular housing for pressurizing the interior of said housing for removing said liquid carrying said pre-coat material from said tubular filter element;
means coupled to said housing for discharging said liquid suspension from said housing; and
liquid drain means including a liquid drain tube coupled to an opening on a lower part of said at least one tubular filter element for draining at least said liquid carrying the inner part of said pre-coat material from the inner part of said at least one tubular filter element and from the filter apparatus prior to input of the liquid to be filtered.

7. The filtration apparatus of claim 6, wherein:
said pre-coat is applied to an outer surface of said at least one tubular filter element; and
said filtrate discharging means and said liquid drain means are coupled to remove said filtrate and at least said liquid of said liquid suspension, respectively, from the interior of said at least one tubular filter element.

8. The filtration apparatus of claim 7, wherein said filtrate discharging means is coupled to an upper part of said at least one tubular filter element.

9. The filtration apparatus of claim 7, further comprising a gas exhaust means coupled to said housing for exhausting purging gas from said housing exterior of said at least one filter element.

10. The filtration apparatus of claim 6, further comprising a gas exhaust means coupled to said housing for exhausting purging gas from said housing exterior of said at least one filter element.

11. The filtration apparatus of claim 6, wherein at least said liquid of said liquid suspension is removed from said at least one filter element by means of said filtrate discharging means during forming of said pre-coat layer.

* * * * *